(12) United States Patent
Asaoka et al.

(10) Patent No.: US 12,159,389 B2
(45) Date of Patent: Dec. 3, 2024

(54) MOLD INFORMATION MANAGEMENT DEVICE, CASTING SYSTEM, MOLD INFORMATION MANAGEMENT METHOD, AND STORAGE MEDIUM

(71) Applicant: SINTOKOGIO, LTD., Nagoya (JP)

(72) Inventors: Yasuaki Asaoka, Nagoya (JP); Kazunori Ogura, Nagoya (JP); Takehiro Sugino, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 395 days.

(21) Appl. No.: 17/550,192

(22) Filed: Dec. 14, 2021

(65) Prior Publication Data
US 2022/0207700 A1 Jun. 30, 2022

(30) Foreign Application Priority Data
Dec. 25, 2020 (JP) ................................. 2020-217536

(51) Int. Cl.
G06T 7/00 (2017.01)
B22D 46/00 (2006.01)

(52) U.S. Cl.
CPC ............ *G06T 7/0004* (2013.01); *B22D 46/00* (2013.01); *G06T 2207/20081* (2013.01); *G06T 2207/20084* (2013.01); *G06T 2207/30116* (2013.01)

(58) Field of Classification Search
CPC ......... G06T 7/0004; G06T 2207/20081; G06T 2207/30116
See application file for complete search history.

(56) References Cited

U.S. PATENT DOCUMENTS

| 5,329,985 | A | 7/1994 | Weimann |
| 2008/0291318 | A1* | 11/2008 | Artonne ................. G03B 37/00 348/340 |
| 2019/0311030 | A1* | 10/2019 | Runbeck ............... G06F 40/103 |
| 2022/0001440 | A1 | 1/2022 | Asaoka et al. |

(Continued)

FOREIGN PATENT DOCUMENTS

| JP | S62-251985 A | 11/1987 |
| JP | H03-147104 A | 6/1991 |
| JP | H06-039489 A | 2/1994 |

(Continued)

*Primary Examiner* — Sam Bhattacharya
(74) *Attorney, Agent, or Firm* — Harness, Dickey & Pierce, P.L.C.

(57) ABSTRACT

An aspect of the present invention provides a mold information management device, a casting system, and a mold information management method each of which makes it possible to reduce a rate of occurrence of defective casting products due to unreadable identification marks, as compared to a conventional rate of the occurrence. A mold information management device includes at least one processor, the processor carrying out: a determination process for determining whether an identification mark is good or not, on the basis of image data or profile data obtained by capturing an image of or scanning a surface of a mold on which the identification mark is engraved; and an associating process for associating the identification mark with information on at least one of history and properties of the mold, in a case where the identification mark has been determined to be good in the determination process.

8 Claims, 6 Drawing Sheets

(56) References Cited

U.S. PATENT DOCUMENTS

2022/0301333 A1* 9/2022 Choi .................... G06V 10/82

FOREIGN PATENT DOCUMENTS

| JP | H11-173816 A | 7/1999 |
| JP | 2000-015395 A | 1/2000 |
| JP | 2014-079775 A | 5/2014 |
| JP | 2018065176 A | 4/2018 |
| JP | 2022-012359 A | 1/2022 |

* cited by examiner

MOLD INFORMATION MANAGEMENT DEVICE, CASTING SYSTEM, MOLD INFORMATION MANAGEMENT METHOD, AND STORAGE MEDIUM

This Nonprovisional application claims priority under 35 U.S.C. § 119 on Patent Application No. 2020-217536 filed in Japan on Dec. 25, 2020, the entire contents of which are hereby incorporated by reference.

TECHNICAL FIELD

The present invention relates to a mold information management device, a casting system, a mold information management method, and a storage medium.

BACKGROUND ART

According to a known method, in casting a metal product with use of a mold, the casting is carried out after a mark indicative of identification information unique to the mold is engraved on the mold. This is for the purpose of allowing for tracing production history of each product. For example, Patent Literature 1 discloses casting in which a marking material where a management code is formed is attached to a molding surface of a master mold for molding a casting sand mold. The management code is formed by a combination of (i) a plurality of protruding characters in a string and (ii) a special mark composed of a plurality of protruding dots whose pattern can be changed. The management code is considered to be changeable by changing the dot pattern in a short time.

CITATION LIST

Patent Literature

[Patent Literature 1]
Japanese Patent Application Publication, Tokukai, No. 2018-65176

SUMMARY OF INVENTION

Technical Problem

The above-described conventional technique is suitable in the case of multiple cavity casting in which a plurality of products are obtained from one sand mold. However, in the conventional technique, there has been a problem in that it is troublesome to attach, to a molding surface of a master mold for molding a casting sand mold, the marking material where the management code is formed.

In view of the above problem, there is a method according to which a unique identification mark is directly engraved on a mold for casting, by using laser or the like. However, in the case of the method according to which an identification mark is engraved on a mold by using laser or the like, it is difficult to adjust a mark engraving condition. Accordingly, in some cases, part of the mark may collapse and/or the depth may be insufficient, so that it is not possible to always engrave a clear identification mark. Consequently, in some cases, the identification mark is unreadable. It follows that the identification mark is also often unreadable on a casting product produced by casting with use of the mold having such an unreadable identification mark. The casting product having the unreadable identification mark may become a defective product (defective casting product) because it is not possible to trace a production condition etc. of the casting product. If such a defective casting product is found in an inspection after casting, the defective casting product must be discarded. This has led to a demand for a method which reduces a rate of occurrence of defective casting products as much as possible.

An object of an aspect of the present invention is to provide a mold information management device, a casting system, and a mold information management method each of which makes it possible to reduce a rate of occurrence of defective casting products due to unreadable identification marks, as compared to a conventional rate of the occurrence.

Solution to Problem

A mold information management device according to an aspect of the present invention includes at least one processor. The processor carries out a determination process for determining whether an identification mark is good or not, on the basis of image data or profile data obtained by capturing an image of or scanning a surface of a mold on which the identification mark is engraved. The processor further carries out an associating process for associating the identification mark with information on at least one of history and properties of the mold in a case where the identification mark has been determined to be good in the determination process.

A casting system according to an aspect of the present invention includes the mold information management device.

In a mold information management method according to an aspect of the present invention, at least one processor carries out a determination process and an associating process. The determination process is a process for determining whether an identification mark is good or not, on the basis of image data or profile data obtained by capturing an image of or scanning a surface of a mold on which the identification mark is engraved. The associating process is a process for associating the identification mark with information on at least one of history and properties of the mold in a case where the identification mark has been determined to be good in the determination process.

A storage medium according to an aspect of the present invention is a computer-readable non-transitory storage medium storing a program for causing a computer to carry out: a determination process for determining whether an identification mark is good or not, on the basis of image data or profile data obtained by capturing an image of or scanning a surface of a mold on which the identification mark is engraved; and an associating process for associating the identification mark with information on at least one of history and properties of the mold in a case where the identification mark has been determined to be good in the determination process.

Advantageous Effects of Invention

An aspect of the present invention makes it possible to provide a mold information management device, a casting system, and a mold information management method each of which makes it possible to reduce a rate of occurrence of defective casting products due to unreadable identification marks, as compared to a conventional rate of the occurrence.

DESCRIPTION OF EMBODIMENTS

Embodiment 1

Figure 1:
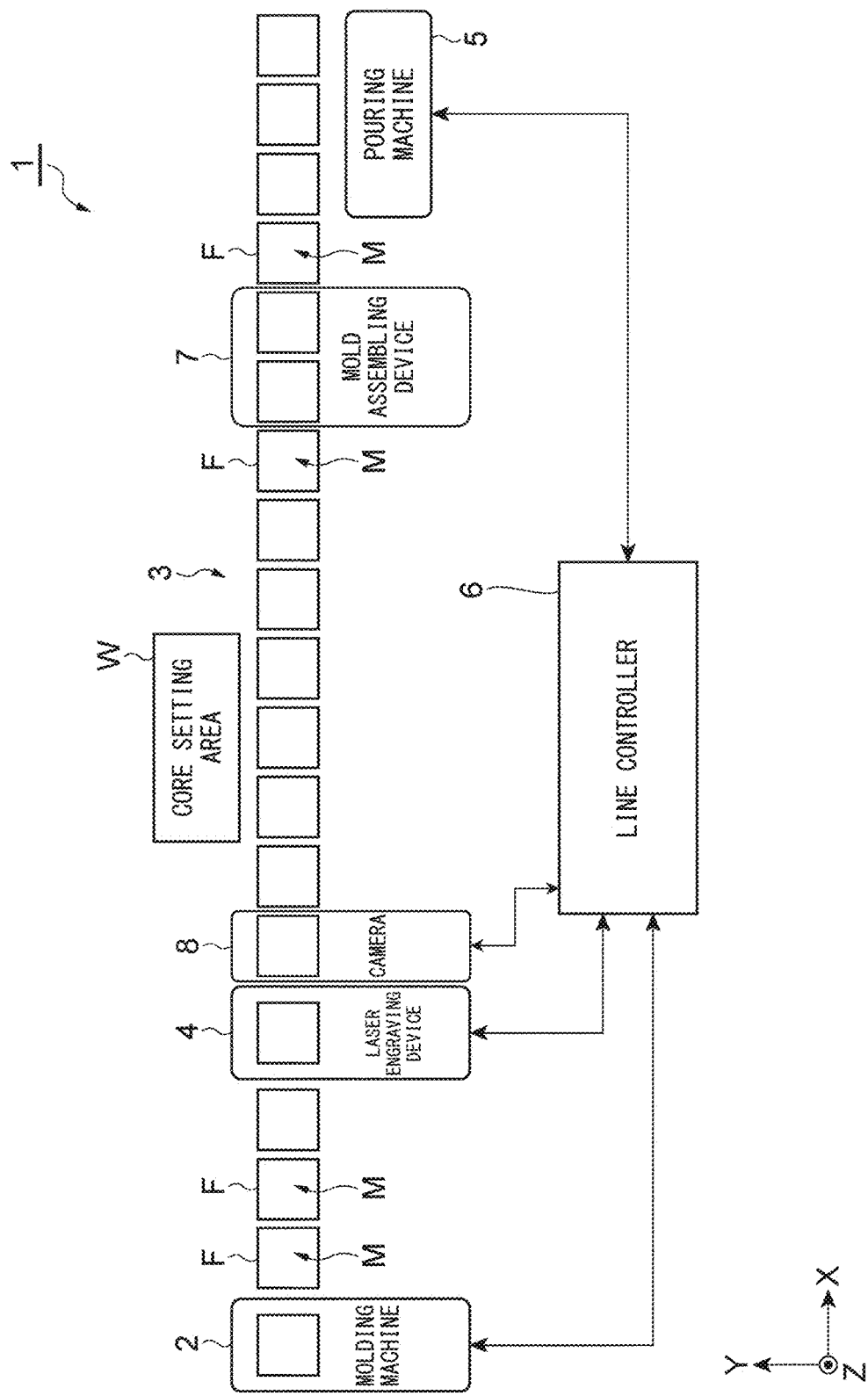
FIG. 1 is a diagram schematically illustrating a configuration of a casting system according to Embodiment 1 of the present invention.

The following description will discuss an embodiment of the present invention. Note that in the following description, identical reference numerals are given to members identical or equivalent to each other, and overlapping descriptions thereof will not be repeated. The drawings do not always show a dimensional ratio in the description. The terms "up", "down", "left", and "right" are based on illustrated states and merely used for convenience. In the drawings, X and Y directions indicate horizontal directions, while a Z direction indicates a vertical direction.

FIG. 1 is a diagram schematically illustrating a configuration of an example of part of a casting system 1 according to Embodiment 1 of the present invention. The casting system 1 is part of a system for producing a casting product. As illustrated in FIG. 1, the casting system 1 includes a molding machine 2, a conveyer line 3, a laser engraving device (first engraving device) 4, a camera 8, a core setting area W, a mold assembling device 7, a pouring machine 5, and a line controller 6. The line controller 6 is an example of a "mold information management device" recited in Claims.

The molding machine 2 is a device for producing molds M. The molds M are each a sand mold formed from, for example, green sand. The green sand includes silica sand, bentonite, and a predetermined additive. The molding machine 2 forms the molds M from the green sand to which moisture is added. The molding machine 2 forms each of the molds M by using a molding flask F. The molding machine 2 is connected to the line controller 6 so as to be capable of communicating with the line controller 6. Upon receipt of a molding start signal from the line controller 6, the molding machine 2 starts producing the mold M. The molding machine 2 places sand (green sand) into the molding flask F where a pattern is provided, and compacts the sand in the molding flask F by applying pressure. The molding machine 2 molds each of a cope corresponding to an upper part of the mold M and a drag corresponding to a lower part of the mold M. Note that in FIG. 1, both of the cope and drag are denoted by the reference sign M. The molding machine 2 transmits a molding completion signal to the line controller 6. The molding completion signal is a signal indicating that the molding machine 2 could mold the mold M by a normal operation. The molding machine 2 is controlled by a molding machine controller (not shown).

Upon receipt of the molding completion signal, the line controller 6 issues a unique mold serial number to the mold M having been molded. Alternatively, the molding machine controller may issue the mold serial number and transmit the mold serial number to the line controller 6. The line controller 6 stores the mold serial number thus issued, in a storage area of a primary memory (described later) corresponding to a process location where the mold M having been molded is first placed. The primary memory is provided with a storage area corresponding to each of the process locations where the mold M (molding flask F) stops in sequence. As the mold M moves to a process location one flask downstream of the present process location at a time, the mold serial number stored in the primary memory is also shifted to another storage area corresponding to the process location one flask downstream. As a result, the correspondence between the mold M and the serial number of the mold M is maintained. The mold serial number is any number that does not overlap with any other mold serial number. The mold serial number may include, for example, the date and the number assigned in the order in which the mold was molded on that date.

The conveyer line 3 is a piece of equipment for conveying the molds. The conveyer line 3 receives the mold M from the molding machine 2, and conveys the mold M downstream. The conveyer line 3 includes, for example, a roller conveyor, rails, a carriage on which the mold M and the molding flask F are mounted and which travels on rails, a pusher device disposed on a side where the molding machine 2 is present (hereinafter, "molding machine 2 side"), and a cushion device disposed on a side where the pouring machine 5 is present (hereinafter, "pouring machine 5 side"), etc. The roller conveyor or the rails extend in a straight line from the molding machine 2 side toward the pouring machine 5 side. The roller conveyor or the rails are not limited to the case of extending in a straight line, and may extend, for example, in a staircase form. The roller conveyor or the rails may extend in one stroke form between the molding machine 2 and the pouring machine 5. The conveyer line 3 sequentially conveys, downstream from the molding machine 2, a plurality of molds M and a plurality of molding flasks F, both of which are arranged at equal intervals on the roller conveyor or the rails. The conveyer line 3 is intermittently driven, and moves the molds M and the casting flasks F by a predetermined number of flasks. The predetermined number of flasks may be one or more. The conveyer line 3 is connected to the line controller 6 so as to be capable of communicating with the line controller 6. Upon receipt of a flask feed signal from the line controller 6, the conveyer line 3 moves the plurality of molds M and the plurality of molding flasks F by the predetermined number of flasks. When the conveyer line 3 completes moving the molds and the flasks by the predetermined number of flasks, the conveyer line 3 transmits a flask feed completion signal to the line controller 6. The conveyer line 3 may transmit the flask feed completion signal to the line controller 6, when completing positioning of the molds M and the molding flasks F which have been moved.

The conveyer line 3 is provided with the laser engraving device 4, and performs laser engraving on the mold M on the conveyer line 3. The laser engraving device 4 may be connected to the line controller 6 so as to be capable of communicating with the line controller 6. The laser engraving device 4, the conveyer line 3, and the line controller 6 constitute a laser engraving system when operating in cooperation. The laser engraving device 4 will be described in detail later.

The conveyer line 3 is provided with the camera 8, and captures an image of an identification mark engraved on a mold M so as to obtain image data of the identification mark. The camera 8 may be connected to the line controller 6 so as to be capable of communicating with the line controller 6. The camera 8 will be described in detail later.

The mold assembling device 7 is a device for assembling the cope and the drag on top of each other so that a mold M is obtained.

The pouring machine 5 is a device for pouring molten metal into the mold M. The pouring machine 5 is connected to the line controller 6 so as to be capable of communicating with the line controller 6. Upon receipt of the flask feed completion signal from the line controller 6, the pouring machine 5 pours the molten metal into the mold M, as a pouring target, located in a pouring area. The pouring machine 5 carries out pouring of the molten metal into the mold M at a predetermined condition. The mold M into which the molten metal was poured is conveyed by the conveyer line 3 to an area where a post-process is carried out.

The core setting area W is provided between the camera 8 and the pouring machine 5. In the core setting area W, an operator is present to set a core in the a mold M. Alternatively, by providing a core setting device for automatically setting cores, the line controller 6 may cause the core setting device to set a core in a mold M.

The line controller 6 is a controller configured to carry out overall control of the casting system 1. The configuration of the line controller 6 will be described in detail later.

Figure 2:
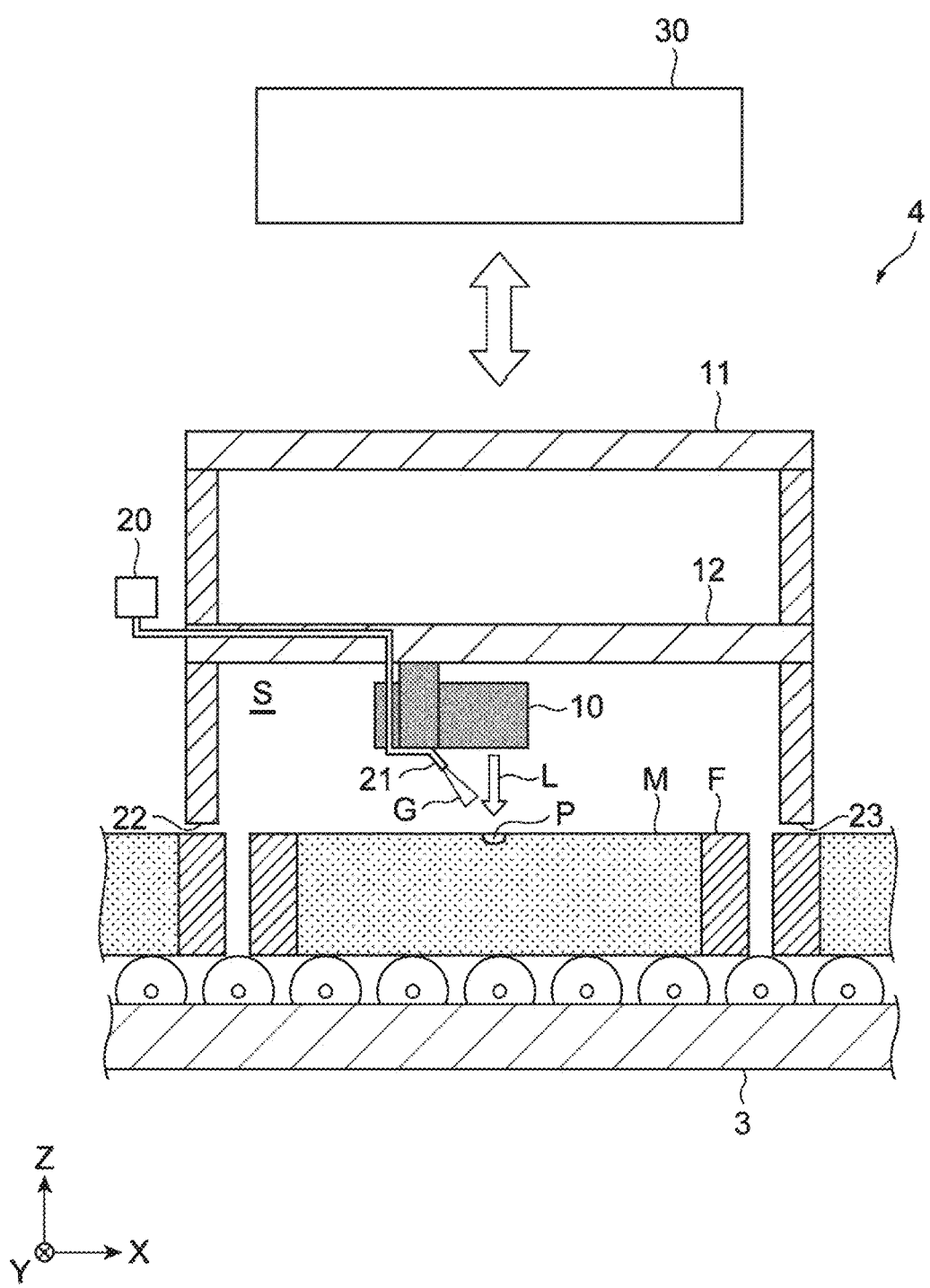
FIG. 2 is a cross sectional view of a laser engraving device of the casting system according to Embodiment 1 of the present invention.

Next, the laser engraving device 4 will be described in detail, with reference to FIG. 2. FIG. 2 is a cross sectional view illustrating an example of a configuration of the laser engraving device 4. As shown in FIG. 2, the laser engraving device 4 includes a head 10, a blowing section 20, and a head control section 30. The laser engraving device 4 is connected to the line controller 6 so as to be capable of communicating with the line controller 6. The conveyer line 3 is provided with the laser engraving device 4, and performs laser engraving of the identification mark on the mold M on the conveyer line 3. The surface of the mold M is the surface that defines the shape of a product to be cast (the surface that transfers the shape of the product). In the present embodiment, the identification mark refers to a symbol string unique to each mold. The symbol string is composed of at least one of characters, numbers, symbols, marks, two-dimensional codes (QR codes (registered trademark), bar codes, etc.), and the like. However, in a case where a plurality of casting products are cast by casting with use of one mold M, identification marks each unique to each of the plurality of casting products are engraved on the surface of the mold M so as to correspond to the casting products, respectively. The wording "engraving a mark" refers to the action of forming characters, numbers, symbols, marks, and/or the like on the mold M. When the identification mark is engraved by laser, the identification mark is formed as a groove or recess.

The identification mark to be engraved is generated by the line controller 6, and transmitted from the line controller to the laser engraving device 4. Alternatively, the identification mark to be engraved may be generated by a controller (not illustrated) of the laser engraving device 4 and engraved, and be transmitted to the line controller 6.

The head 10 is a component for focusing a laser beam L to a part P to be engraved. The head 10 is connected to a light source (not illustrated) for generating laser beams. The head 10 has, for example, a galvano mirror (not illustrated) and a focusing lens (not illustrated), so as to adjust irradiation position and focal length of the laser beam L. The head 10 sets the focal point of the laser beam L to the part P to be engraved on the surface of the mold M, and engraves the identification mark. The part P to be engraved is set in a predetermined area of the mold M. The head 10 is housed in a work space S defined within the case 11. The head 10 is supported by a frame member 12 which is provided in the work space S.

The case 11 has a carry-in opening 22 and a carry-out opening 23 which communicate with the work space S. The case 11 is provided to the conveyer line 3 so that the mold M can be carried in and out of the work space S through the carry-in opening 22 and the carry-out opening 23. For example, in a case where the conveyer line 3 extends in a straight line, the case 11 is provided with the carry-in opening 22 and the carry-out opening 23 which are formed so as to face each other. The conveyer line 3 is provided with the case 11 such that the direction in which the carry-in opening 22 and the carry-out opening 23 face each other coincides with the direction in which the conveyer line 3 extends.

The blowing section 20 blows gas G onto the surface of the mold M. The blowing section 20 is a device for sending out the gas G, such as an electric fan, a compressor, or a blower. In a case where the blowing section 20 is a compressor or blower, the blowing section 20 has a discharge nozzle 21 which blows the gas G toward the surface of the mold M. The discharge nozzle 21 is provided to, for example, the head 10. The discharge nozzle 21 may be supported by the frame member 12. In a case where the blowing section 20 is an electric fan, the blowing section 20 may be supported by the head 10 or the frame member 12.

The head control section 30 controls the head 10. The term "control" refers to determining position and operation. The head control section 30 is configured as, for example, a Programmable Logic Controller (PLC). The head control section 30 may be provided outside or inside the case 11.

The head control section 30 mainly controls output, the irradiation position, the focal length, etc. of the laser beam L. The head control section 30 controls the output, the irradiation position, and the focal length of the laser beam L, by controlling the laser light source, the galvano mirror and the focusing lens. The head 10 engraves the identification mark on the part to be engraved P, under control of the head control section 30. Evaporation of moisture etc. contained in the mold M occurs due to irradiation with the laser beam L. This may cause vapor or a residuum to block a view of surroundings. However, since the vapor or the like is blown off by blowing the gas G from the discharge nozzle 21, the vapor or the like does not affect data obtainment, which will be described later.

The head control section 30 may control operation of the blowing section 20. In this case, the head control section 30 outputs, to the blowing section 20, a start signal, an end signal, a signal indicating a target pressure, and the like. The blowing section 20 operates on the basis of those signals received from the head control section 30. The head control section 30 causes the head 10 to engrave the identification mark while the blowing section 20 is blowing the gas G. The head control section 30 operates the head 10, after or at the same time as causing the blowing section 20 to start blowing, and causes the head 10 to engrave the identification mark on the mold M.

The laser engraving device 4 transmits an engraving completion signal to the line controller 6, when engraving the identification mark has been completed. Upon receipt of the engraving completion signal from the laser engraving device 4, the line controller 6 issues an individual identification serial number corresponding to that identification mark. Alternatively, upon completion of engraving the identification mark, the controller of the laser engraving device 4 may issue an individual identification serial number corresponding to the identification mark, and transmit the individual identification serial number to the line controller 6. Alternatively, the line controller 6 or the controller of the laser engraving device 4 may issue the individual identification serial number for a mold to be engraved in advance prior to the start of engraving the identification mark.

The reason why an individual identification serial number corresponding to an identification mark is issued is that a plurality of casting products may be cast with use of one mold M as described above. When a plurality of casting products are cast with use of one mold M, a plurality of identification marks are engraved on the mold M. That is, the mold serial number and the identification mark of the mold M do not correspond to each other in a one-to-one relation. Therefore, the individual identification serial number is issued so as to correspond to the identification mark in a one-to-one relation. Then, the individual identification serial number and the mold serial number are associated with each other. Note that in a case where one casting product is cast with use of one mold M, the line controller 6 may or may not issue the individual identification serial number. If the individual identification serial number is issued, the line controller 6 should associate the identification mark with the individual identification serial number. On the other hand, in a case where the individual identification serial number is not issued, the line controller 6 should associate the individual identification serial number with the mold number.

Figure 3:
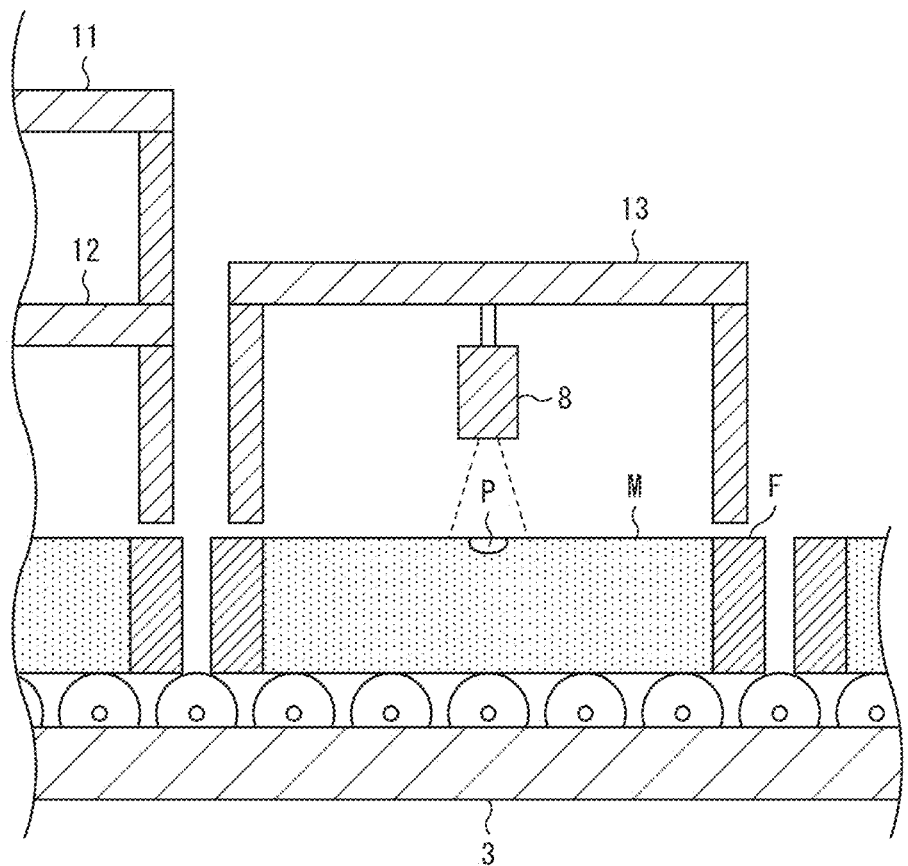
FIG. 3 is a diagram illustrating a position of a camera of the casting system according to Embodiment 1 of the present invention.

Next, the following will describe the camera 8 in detail, with reference to FIG. 3. FIG. 3 is a diagram illustrating a position of the camera 8. As illustrated in FIG. 3, the camera 8 is attached to a camera mount 13 provided at a process location one flask downstream of the process location where the laser engraving device 4 is disposed. The camera 8 obtains image data by capturing an image of the surface of a mold on which an identification mark is engraved, after the identification mark is engraved on the surface of the mold by the laser engraving device 4 provided at a process location one flask upstream of the process location where the camera 8 is provided. The camera 8 is a data obtaining device for obtaining image data of the identification mark engraved by the laser engraving device 4. The camera 8 transmits, to the line controller 6, the image data thus obtained.

It is possible to use, as a data obtaining device alternative to the camera 8, a surface profile measuring device which obtains profile data of the surface of the mold by scanning the surface of the mold on which the identification mark is engraved. This makes it possible to obtain two- or three-dimensional profile data of the identification mark engraved. The surface profile measuring device is, for example, a range sensor. The range sensor emits, for example, a laser beam or infrared light, and calculates the distance to the surface of the mold by the time-of-flight method. The range sensor makes it possible to obtain the profile data of the identification mark, i.e., the data of the depth of the identification mark engraved. The profile data may be two-dimensional depth data obtained by scanning in one direction, or three-dimensional depth data obtained by scanning the whole of the identification mark in two directions which are orthogonal to each other. The range sensor transmits, to the line controller 6, the profile data thus obtained.

Note that the position where the camera 8 is to be attached is not necessarily at the process location downstream of the laser engraving device 4. For example, the camera 8 may be provided at the process location where the laser engraving device 4 is provided. That is, the camera 8 may be attached to the frame member 12 where the laser engraving device 4 is attached. Alternatively, the camera 8 may be attached to the head 10 of the laser engraving device 4. As described above, the camera 8 can be attached to any position where it is possible to obtain the image data of the identification mark engraved.

Figure 4:
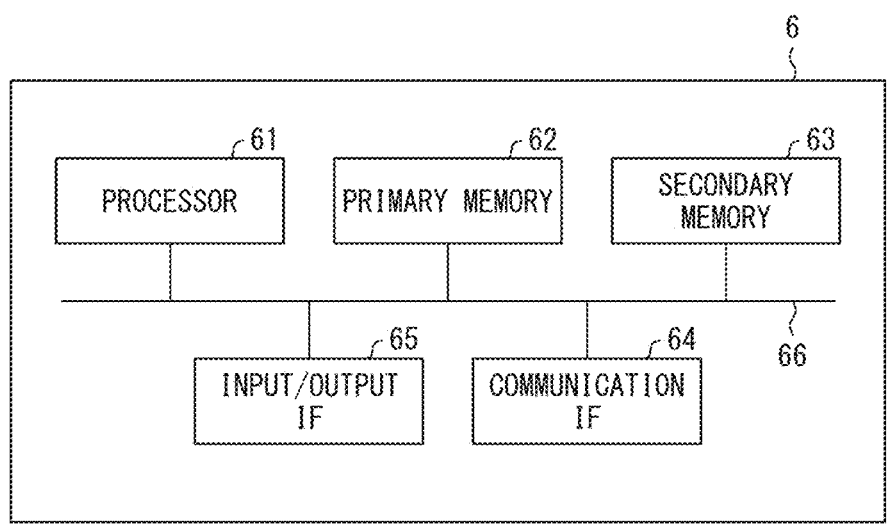
FIG. 4 is a block diagram illustrating a configuration of a line controller of the casting system according to Embodiment 1 of the present invention.

Next, the following will describe the line controller 6 in detail, with reference to FIG. 4. FIG. 4 is a block diagram illustrating a configuration of the line controller 6.

As illustrated in FIG. 4, the line controller 6 is realized by a general purpose computer, and includes a processor 61, a primary memory 62, a secondary memory 63, an input/output interface (I/O IF) 64, a communication interface (communication IF) 65, and a bus 66. The processor 61, the primary memory 62, the secondary memory 63, the input/output interfaces 64, and the communication interfaces 65 are interconnected with each other via the bus 66.

The secondary memory 63 has a mold information management program and a learned model stored therein. The processor 61 executes each step of a mold information management method M1, following commands contained in the mold information management program. The learned model is used when the processor 61 carries out step M11 (described later) of the mold information management method M1. Note that the wording "the secondary memory 63 has the learned model stored therein" means that parameters defining the learned model are stored in the secondary memory 63.

A device that can be used as the processor 61 is, for example, a central processing unit (CPU), a graphic processing unit (GPU), or a combination of these.

A device that can be used as the primary memory 62 is, for example, a semiconductor random access memory (RAM). A device that can be used as the secondary memory 63 is, for example, a flash memory, a hard disk drive (HDD), a solid state drive (SSD), or any combination of these.

The input/output interface 64 is configured to have an input device(s) and/or an output device(s) connected thereto. Examples of the input/output interface 64 include an interface such as a universal serial bus (USB). The input device connected to the input/output interface 64 can be, for example, the camera 8. Data obtained from the camera 8 in the mold information management method M1 is inputted to the line controller 6 and stored in the primary memory 62.

The communication interface 65 is configured to have, connected thereto, another computer in a wired manner or wirelessly over a network. Examples of the communication interface 65 include Ethernet (registered trademark) and Wi-Fi (registered trademark) interfaces. The following data are transmitted and received over such a network(s): data (for example, learned model) that the line controller 6 obtains from another computer (for example, machine learning device) in the mold information management method M1; and data that the line controller 6 provides to another computer in the mold information management method M1.

Note that, although the present embodiment employs a configuration in which a single processor (processor 61) is used to carry out the mold information management method M1, the present invention is not limited to such. That is, it is possible to employ a configuration in which a plurality of processors are used to carry out the mold information management method M1.

Although the present embodiment employs a configuration in which the learned model is stored in a memory (secondary memory 63) that is contained in the computer in which a processor (processor 61) that carries out the mold information management method M1 is contained, the present invention is not limited to such. That is, it is possible to employ a configuration in which the learned model is stored in a memory that is contained in a computer different from the computer in which the processor that carries out the mold information management method M1 is contained.

Although the present embodiment employs a configuration in which the learned model is stored in a single memory (secondary memory 63), the present invention is not limited to such. That is, it is possible to employ a configuration in which the learned model is divided into a plurality of parts and stored in a plurality of memories, respectively.

Next, the mold information management method will be described below. Prior to this, the following will describe information on at least one of history and properties of a mold (hereinafter, also referred to as "mold information"). In the present embodiment, the wording "information on at least one of history and properties of a mold" (mold information) mainly refers to information on at least one of (i) molding history in molding the mold and (ii) properties of foundry sand used in the mold molded. This information is also referred to as "molding history data". However, the mold information is not limited to this. For example, the mold information may be part of shift data. Examples of the shift data include, for example, molding history data, molten metal condition data, alloy material input history data, and the like. That is, the mold information may be obtained by adding at least part of the molten metal condition data or the alloy material input history data to the molding history data of the mold. The content of each of the molding history data, the molten metal condition data, and the alloy material input history data will be described later. The molding history data, the molten metal condition data, the alloy material input history data, and/or the like are associated with the mold serial number of the mold or the individual identification serial number. By associating the identification mark with the mold information or the shift data, it becomes easy to apply the above-described mold information management device to a conventional casting system using the shift data.

As described above, in the primary memory of the line controller 6, a storage area is allocated so as to correspond to a process location which is for each flask and into which the mold is conveyed. When a mold is conveyed to a process location, the mold serial number or individual identification serial number of the mold is recorded in the storage area corresponding to that process location. When the mold is shifted by one flask, the mold serial number or individual identification serial number recorded in the storage area is also shifted and recorded in another storage area corresponding to another process location of a destination where the mold is conveyed. Therefore, the mold serial number or individual identification serial number and the aforementioned data associated therewith are referred to as "shift data". By associating the identification mark with the shift data, it is possible to trace the production condition etc. of the casting product from the identification mark engraved on the casting product.

Among the shift data, examples of the molding history data include the weight of inputted sand, compression ratio, static pressure or squeeze pressure, squeeze time, pressure rising speed, squeeze stroke, mold thickness, aeration pressure, product surface shape, and molding time, in molding of a mold. Examples of the molding history data may include data of compactability (CB), moisture, sand temperature, air permeability, and mold strength (pressure resistance) of the foundry sand with which the mold is molded. Examples of the molten metal condition data include the weight, temperature, tapping furnace number or charge number, and material number of molten metal poured by the pouring machine 5, time of receipt of molten metal, a time from receipt of molten metal to start of pouring of the molten metal, time from start to end of pouring of molten metal, and the amount of an inputted inoculant. Further, examples of the molten metal condition data may include data regarding properties (including molten metal components, etc.) of molten metal obtained as a result of melting in a furnace. The molten metal condition data may also include, for example, data with regard to molten metal components after inoculation in a casting ladle. The alloy material input history data is, for example, the type, weight, and time at which an alloy material is put in the molten metal. The molding history data, the molten metal condition data, the alloy material input history data, and the like are each measured by an appropriately placed measuring device (not illustrated), and measurement results are transmitted to the line controller 6. Alternatively, the measurement results may be transmitted to respective controllers (not illustrated) provided in the molding machine 2, the pouring machine 5, the conveyer line 3, etc., and the respective controllers may transmit the measurement results to the line controller 6.

Figure 5:
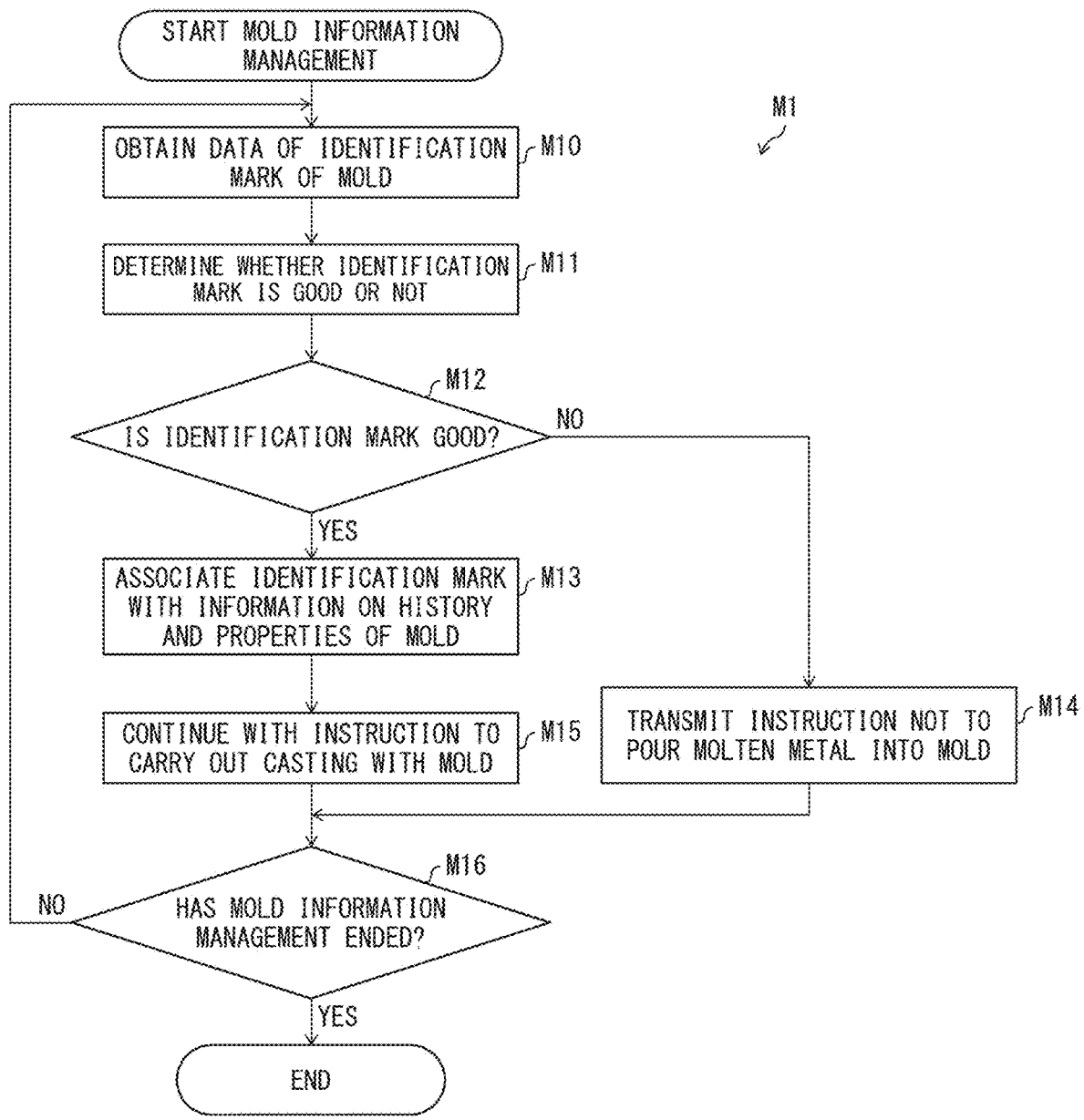
FIG. 5 is a flowchart illustrating a flow of a mold information management method according to Embodiment 1.

Next, the following will describe the mold information management method M1, with reference to FIG. 5. FIG. 5 is a flowchart illustrating a flow of the mold information management method M1. First, in step M10, the processor 61 of the line controller 6 obtains data of an identification mark of a mold. Specifically, the processor 61 obtains image data or profile data of the identification mark. Next, in step M11, the processor 61 determines, on the basis of the obtained data of the identification mark, whether the identification mark is good or not (determination process, determination step). The wording "whether the identification mark is good or not" means, for example, whether or not the identification mark is readable to an operator. If the operator can read the identification mark, the identification mark is determined to be good. On the other hand, if the operator cannot read the identification mark, the identification mark is determined to be not good. As described above, in the present embodiment, in the determination process, the processor 61 determines the image data or the profile data with use of the learned model. As compared to a case where an operator determines by visual check whether the identification mark is good or not, more reliable and quick determination is possible by causing the learned model to determine whether the identification mark is good or not.

Next, if a result of determining whether the identification mark is good or not in step M12 is "good" (step M12: YES), the flow of mold information management (hereinafter, referred to as "management flow") proceeds to step M13. In step M13, the processor 61 associates the identification mark with mold information (associating process, associating step), and the management flow proceeds to step M15. On the other hand, if the result of determining whether the identification mark is good or not in step M12 is "not good" (step M12: NO), the management flow proceeds to step M14. In step M14, the processor 61 transmits, to the pouring machine 5, an instruction not to pour molten metal into that mold, and the management flow proceeds step M16. In a case where the casting system includes a core setting device, the processor 61 may transmit, to the core setting device, an instruction not to set the core in the mold. Alternatively, in a case where an operator sets the core, the processor 61 may specify the mold and notify the operator not to set the core in the mold by an alarm or the like.

In step M15, the processor 61 causes casting with use of the mold to be continued. Then, the management flow proceeds to step M16. In step M16, the processor 61 determines whether or not the mold information management has ended. The wording "the mold information management has ended" refers to a case where determinations for respective identification marks of all molds have been made or a case where the casting system has been stopped. If it is determined in step M16 that the mold information management has ended (step M16: YES), the mold information management ends. If it is determined in step M16 that the mold information management has not ended (step M16: NO), the management flow returns back to step M10. The processor 61 then obtains data of an identification mark of a next mold.

The above description on the mold information management method has dealt with a case where the processor 61 of the line controller 6 carries out all of the steps. That is, the above has described a case where the function of the mold information management device is realized by the line controller 6 alone. However, the function of the mold information management device is not necessarily realized by the line controller 6 alone. It is possible to have a configuration in which the function of the mold information management device is realized by cooperative operation of the line controller 6 and a controller of a device for a certain process. For example, the determination process is not necessarily carried out by the line controller 6. For example, it is possible to provide a data obtaining device including the camera 8 and a camera controller (not illustrated). Then, the camera controller may carry out the determination process using the learned model, on the basis of the image data obtained by the camera 8. Such a determination result may be then transmitted to the line controller 6. The line controller 6 may carry out the associating process based on the determination result, or may cause casting with use of the mold to be continued.

The above-described mold information management method makes it possible to reduce a rate of occurrence of defective casting products due to unreadable identification marks, as compared to a conventional rate of the occurrence. Specifically, after it is determined that the identification mark engraved on the mold is readable, the mold information and the identification mark are associated with each other. This can reduce the rate of occurrence of defective casting products whose mold information cannot be traced due to unreadable identification mark.

Note that in order to carry out the above determination process, the learned model is generated in advance, by causing the machine learning device to read training data and to learn determination of whether identification marks are good or not. The training data includes, for example, image data or profile data of identification marks engraved on molds, and "good" or "not good" results obtained by determination by operator's visual check of the image data or the profile data. Then, the machine learning device is caused to read, as a set, the image data or the profile data of the identification marks together with the "good" or "not good" results of that data, so that the learned model is generated. Into the learned model thus generated, image data or profile data of an identification mark is inputted. As a result, whether the identification mark is good or not is outputted.

Alternatively, the learned model may be generated by causing the machine learning device to read, as training data, data of engraved identification marks and image data or profile data thereof. In such cases, the learned model outputs "good" if an identification mark read from image data or profile data corresponds to the data of the engraved identification marks. On the other hand, the learned model outputs "not good" in a case where a read identification mark differs from the data of the engraved identification marks. In determination with use of such a learned model, in some cases, even an identification mark which a user cannot read can be read by the learned model, that is, can be determined to be good. In the case of the learned model obtained as a result of learning by using, as the training data, only data of identification marks readable to an operator as described above, determination results may vary depending on experience of the operator or a ratio of "good" determination may be lower. In contrast, in the case of a learned model obtained as a result of learning by using, as training data, only data of "good" results of determination by artificial intelligence (AI) regardless of operator's determination, determination results less vary as compared to the case of the learned model based on operator's experience, and the ratio of "good" determination is expected to be higher. This makes it possible to further reduce the rate of occurrence of defective casting products.

The machine learning device can employ an algorithm of, for example, a model of a neural network such as a convolutional neural network or a recursive neural network, a regression model such as a linear regression model, or a tree model such as a regression tree model.

The image data obtained can be directly used as image data for determination. On the other hand, in the case of profile data of the surface, data obtained by the range sensor is numerical data. This may be directly learned by the machine learning device, but it is more preferable to use data of an image made from the numerical data. This is because, in a convolutional neural network or the like, determination accuracy is higher in cases where an image is used for determination. The data of an image made from a surface profile is, for example, data in which the height in the surface profile is represented by contour lines, data in which the height is represented by different colors or by different color concentrations, or the like.

Next, the following will describe the associating process. First, in step M13, the processor 61 associates an identification mark engraved on a mold M with the shift data. As described earlier, the shift data includes: molding history data, molten metal condition data, alloy material input history data, or the like; or the mold serial number of a mold or the individual identification serial number associated with the forgoing data.

In the present embodiment, the term "associate" refers to link, and a method thereof is not limited. For example, the term may mean recording, in one data set, two pieces of information or data to be associated with each other. Alternatively, if the two pieces of information or data to be associated are recorded in two different data sets, respectively, the term may mean recording, in the data sets, respectively, names of the data sets to be referred to so that a cross reference can be made between the two different data sets. Further, the two pieces of information or data to be associated may be associated with each other via one or more data sets.

In the present embodiment, as compared to determination by operator's visual check, more reliable and quick determination is possible by determination with use of the learned model which has been caused to learn (i) identification marks engraved on molds; and (ii) operator's determination results (or data of the identification marks).

In a case where the determination result of an identification mark engraved on a mold is "good", the processor 61 associate the identification mark with mold information of the mold. After it is determined that the identification mark engraved on the mold is readable, the identification mark and the mold information are associated with each other. This can reduce the rate of occurrence of defective casting products whose mold information cannot be traced due to unreadable identification marks, as compared to a conventional rate of the occurrence.

Further, on condition that the identification mark engraved on the mold has been associated with the mold information, the processor 61 causes casting with use of the mold to be continued. The processor 61 normally carries out control for carrying out the following in succession: molding a mold M, engraving an identification mark, obtaining data of an identification mark, determination an identification mark, (setting a core) and pouring molten metal. Therefore, when the processor 61 has completed associating an identification mark engraved on a mold, with mold information of the mold, the processor 61 continues with normal continuous operation.

Conversely, if the determination result of the identification mark is "not good", the processor 61, for example, issues an alarm and at the same time transmits, to the pouring machine 5, an instruction not to pour molten metal into the mold. In a case where an operator sets a core, the processor 61 specifies the mold and notifies, with an alarm or the like, the operator not to set the core. In a case where the core setting device sets a core, the processor 61 controls the core setting device so that the core setting device will not set the core in the mold. That is, the processor 61 transmits, to the core setting device, an instruction not to set the core in the mold. This control reliably stops production of a defective casting product by using a mold having an unreadable identification mark. Therefore, it is possible to reduce the rate of occurrence of defective casting products, as compared to a conventional rate of the occurrence. In addition, even if a mold is determined to be not good, it would be possible to stop only casting with use of that mold since in-line determination of an identification mark is carried out. Accordingly, it is unnecessary to entirely stop the processes. This makes it possible to minimize deterioration in production efficiency of casting products.

Embodiment 2

The following description will discuss another embodiment (Embodiment 2) of the present invention, with reference to drawings. For convenience of description, members having functions identical to those described in Embodiment 1 above are assigned identical reference signs, and their descriptions are not repeated here.

Figure 6:
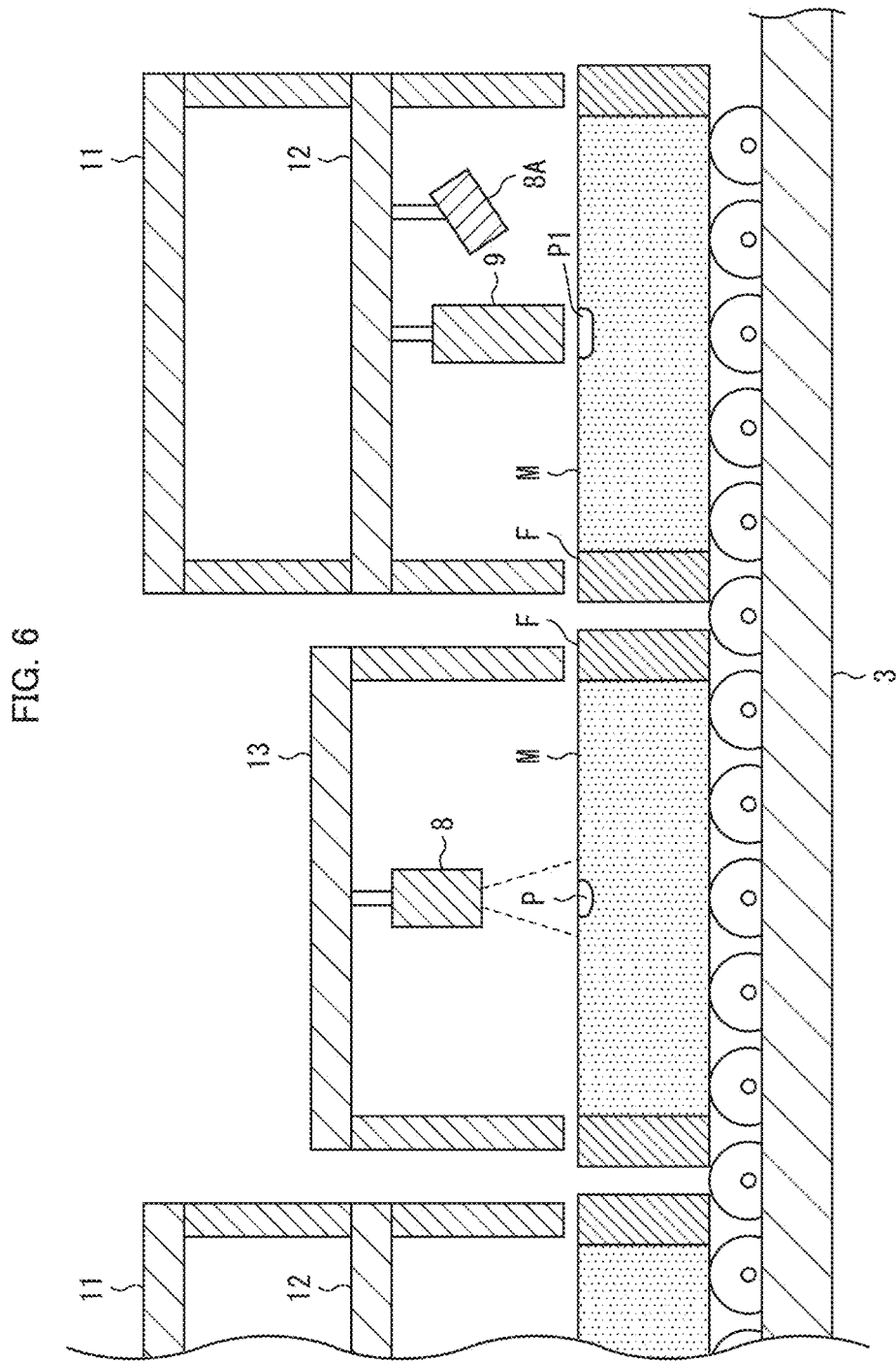
FIG. 6 is a diagram illustrating a position of a second engraving device according to Embodiment 2 of the present invention.

Since a casting system 1A according to Embodiment 2 of the present invention is generally configured as in the casting system 1 according to Embodiment 1, a description thereof is omitted. The casting system 1A differs from the casting system 1 in that the casting system 1A has a second engraving device 9 and a second camera 8A. It is possible to use a second surface profile measuring device instead of the second camera. In the following description, the term "second camera" refers to the second camera or the second surface-profile measuring device. FIG. 6 is a diagram illustrating respective positions of the second engraving device 9 and the second camera 8A according to Embodiment 2.

As illustrated in FIG. 6, the second engraving device 9 is provided at a process location one flask downstream of the camera 8. The second engraving device 9 is a device for engraving a new identification mark (second identification mark) on the surface of a mold in a case where a first determination result made by a processor 61 with regard to an identification mark is "not good". If the first determination result for a mold M is "not good", the mold M is conveyed, by a conveyer line 3, to a process location which is one flask downstream of the current process location and in which the second identification mark can be engraved by the second engraving device 9. The second engraving device 9 may be a laser engraving device, or may be an engraving machine of a type by which the surface of a mold is physically cut with use of a needle-like rod.

Such engraving (re-engraving) is carried out at a position P1 that may or may not be the same as a position P where the identification mark is first engraved. Further, the second identification mark to be engraved may or may not be the same as the identification mark that has been first engraved.

Without providing the second engraving device 9, an operator may engrave the second identification mark by using an engraving machine. However, in a case where the operator engraves the second identification mark, the second identification mark to be engraved is preferably an identification mark (e.g., a dot identification mark) which can be engraved in a short time.

The second camera 8A captures an image of or scans the surface of the mold on which the second identification mark is engraved by the second engraving device. As a result, the second camera 8A obtains image data or profile data of the second identification mark engraved. The processor 61 determines whether the second identification mark is good or not, on the basis of the image data or the profile data of the second identification mark obtained by the second camera 8A. Alternatively, the operator may determine whether the second identification mark is good or not, by looking at the image data or the profile data of the second identification mark engraved or by directly checking the second identification mark visually.

In a case where the processor 61 determines whether the second identification mark is good or not, the steps described in Embodiment 1 are carried out depending on a determination result. That is, if the determination result is "good", the processor 61 associates the mold information of the mold with the second identification mark engraved. Further, the processor 61 gives an instruction to continue with a subsequent casting process. If the determination result is "not good", the processor 61 transmits, to a pouring machine 5, an instruction not to pour molten metal into that mold. In a case where the casting system 1A includes a core setting device, the processor 61 may transmit, to the core setting device, an instruction not to set a core in the mold. Alternatively, in a case where an operator sets the core, the processor 61 may specify the mold and notify the operator not to set the core in the mold by an alarm or the like.

In a case where an operator determines whether or not the second identification is good or not, the operator inputs a determination result to the line controller 6. For example, when the determination result is "good", the operator presses a switch corresponding to the determination "good". In response, the processor 61 associates mold information with the second identification mark engraved. The processor 61 then gives an instruction to continue with a casting process as normal. If the determination result of a mold is "not good", the operator presses a switch corresponding to the determination "not good". In response, the processor 61 transmits, to the pouring machine 5, an instruction not to pour molten metal into the mold. In a case where the casting system 1A includes a core setting device, the processor 61 may transmit, to the core setting device, an instruction not to set a core in the mold. Alternatively, in a case where an operator sets the core, the processor 61 may specify the mold and notify the operator not to set the core in the mold by an alarm or the like.

Figure 7:
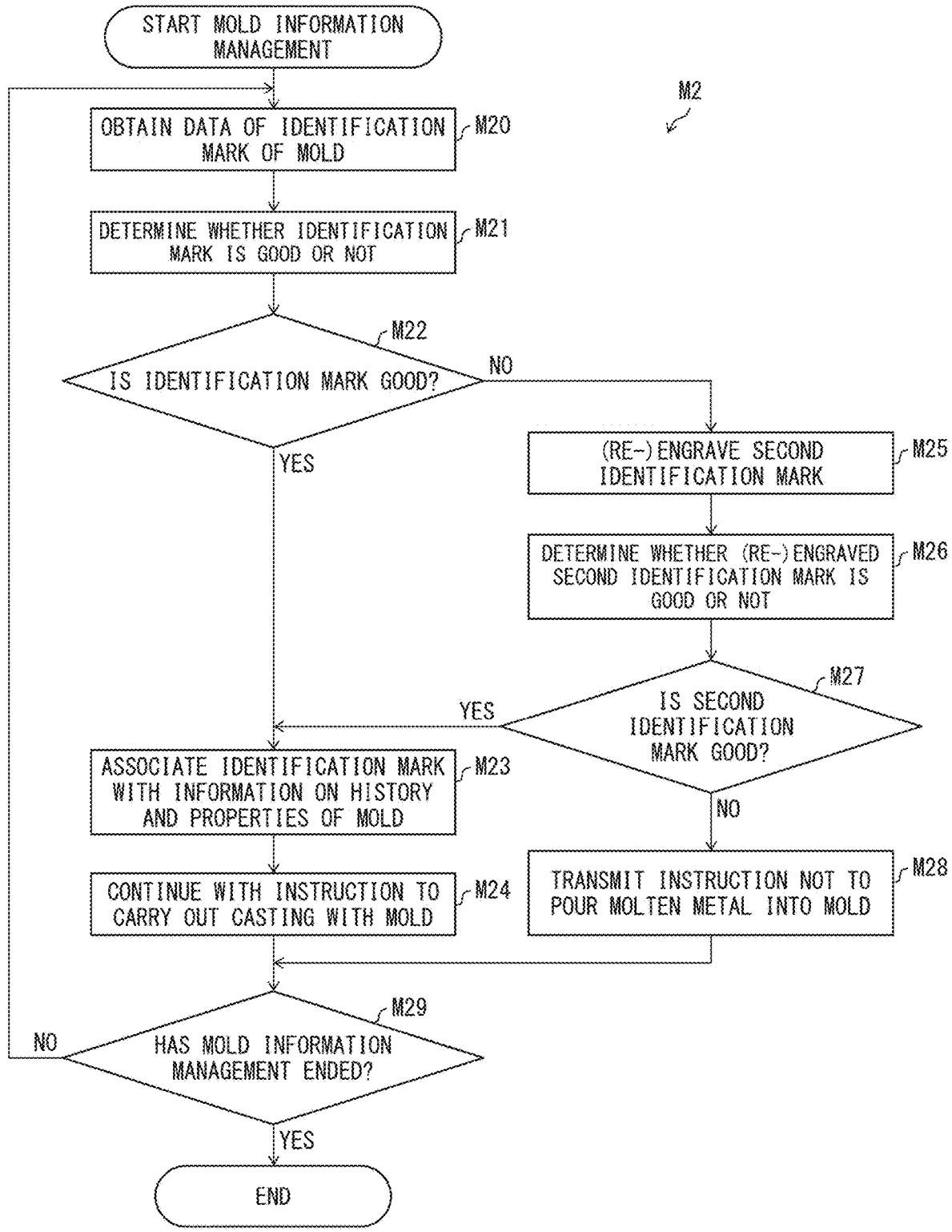
FIG. 7 is a flowchart illustrating a flow of a mold information management method according to Embodiment 2.

Next, the following will describe a mold information management method M2 according to Embodiment 2, with reference to FIG. 7 Note that the following describes a case where the second engraving device 9 engraves the second identification mark, and the processor 61 determines whether the second identification mark is good or not. FIG. 7 is a flowchart illustrating a flow of the mold information management method M2 according to Embodiment 2. In the mold information management method M2, steps M20 to M22 are identical to steps M10 to M12 of the mold information management method M1 according to Embodiment 1.

In step M22, the processor 61 determines whether an identification mark is good or not by using obtained identification mark data (determination process). The processor 61 may carry out this determination process by using a learned model, as described in Embodiment 1. If a result of determining whether the identification mark is good or not in step M22 is "good" (step M22: Y), a management flow proceeds to step M23. The processor 61 then associates the identification mark with the mold information (associating process). Further, the management flow proceeds to step M24, and continues casting with use of the mold. The management flow then proceeds further to step M29.

On the other hand, if the result of determining whether the identification mark is good or not in step M22 is "not good" (step M22: NO), the management flow proceeds to step M25. In step M25, the processor 61 causes the second engraving device 9 to engrave the second identification mark. Next, the management flow proceeds to step M26, and the processor 61 determines whether the second identification mark is good or not. Subsequently, the management flow proceeds to step M27. If a result of determining whether the second identification mark is good or not is "good" (step M27: Y), the management flow proceeds to step M23. The processor 61 then associates the second identification mark with the mold information.

On the other hand, if the result of determining whether the second identification mark is good or not in step M27 is "not good" (step M27: NO), the management flow proceeds to step M28. In step M28, the processor 61 transmits, to the pouring machine 5, an instruction not to pour molten metal into that mold. Then, the management flow proceeds to step M29. Step M29 is the same as step M16 of the mold information management method M1. In a case where the casting system 1A includes a core setting device, the processor 61 in step M28 may transmit, to the core setting device, an instruction not to set a core in the mold. Alternatively, in a case where an operator sets the core, the processor 61 in step M28 may specify the mold and notify the operator not to set the core in the mold by an alarm or the like.

As described above, as a result of providing the second engraving device 9, even if an identification mark has not been successfully formed by the laser engraving device 4, it would be possible to newly engrave a mark, with use of the second engraving device, and to carry out determination.

This makes it possible to further reduce the rate of occurrence of defective casting products. In addition, it is possible to reduce the number of molds into which molten metal is not to be poured, and therefore to prevent deterioration in production efficiency. Further, if by chance the laser engraving device 4 breaks down, the second engraving device 9 could be used as a substitute engraving machine, and accordingly, the casting system need not be stopped. Therefore, even if an identification mark has not been successfully formed by the laser engraving device 4 or even if the laser engraving device 4 breaks down, it would be possible to prevent deterioration in production efficiency, which deterioration might have occurred in absence of the second engraving device 9.

Embodiment 3

The following description will discuss Embodiment 3. In obtaining image data of an identification mark or a second identification mark (hereinafter, both referred to as "identification mark") by use of a camera 8 or a second camera 8A as explained in the foregoing Embodiments 1 and 2, the position of the identification mark may not be easily found. In light of this, in Embodiment 3, the following describes a method of making it easier to find the position of an identification mark. This method is particularly useful in cases where the identification mark is engraved by a laser engraving device.

The color of the surface of a molded mold is usually close to black. Even when an identification mark is engraved on the surface of the mold, the entire surface remains black. Accordingly, it is difficult to find the position where the identification mark is engraved. Further, for example, in determining whether the identification mark is good or not by capturing an image with use of a camera or the like, it may not be possible to appropriately distinguish an engraved portion and the other portion. This may make such determination difficult. In light of the above, the position where the identification mark is engraved is discolored. This makes it possible to easily recognize the identification mark engraved. The method of discoloring the surface of the mold is not particularly limited. For example, the surface of the mold can be discolored to white by irradiating the surface with a laser. In a case where the identification mark is engraved by the laser engraving device as described in Embodiment 1 or 2 above, an area where the identification mark is engraved is irradiated with laser after at least one of the power and the focal length of the laser engraving device in engraving the identification mark is changed. In particular, by changing the focal length of the laser, a wider area is irradiated with the laser, so that the surface of the area can be discolored without formation of a recess.

Laser irradiation may be carried out for discoloring the surface, before or after the identification mark is engraved. In a case where discoloration is carried out by laser irradiation before engraving the identification mark, the discoloration is eliminated in a recess of the identification mark engraved. This causes the identification mark to be in more contrasting color. In a case where the discoloration is carried out by laser irradiation after engraving the identification mark, at least the position engraved becomes apparent although the recess of the identification mark engraved is discolored together.

In a case where the identification mark is engraved without use of the laser engraving device, for example, a colorant may be blown and attached to an area where the identification mark is engraved. It is preferable to select, as a color for coloring, a white-based color which exhibits a high contrast when an image is captured by the camera. The colorant may be blown and attached before or after the identification mark is engraved. It should be noted that even in a case where the identification mark is engraved by using the laser engraving device, it is possible to employ a method according to which a colorant is blown and attached for coloring.

A mold information management device according to another aspect of the present invention includes at least one processor, the processor carrying out: a determination process for determining whether an identification mark is good or not, on the basis of image data or profile data obtained by capturing an image of or scanning a surface of a mold on which the identification mark is engraved; and an instruction process for giving an instruction not to pour molten metal into the mold, in a case where the identification mark has been determined to be not good in the determination process. This makes it possible to reduce a rate of occurrence of defective casting products whose mold information cannot be traced due to unreadable identification marks, as compared to a conventional rate of the occurrence.

A mold information management device according to another aspect of the present invention includes: at least one processor; a first engraving device configured to engrave an identification mark; and a second engraving device different from the first engraving device, the processor carrying out: a determination process for determining whether the identification mark is good or not, on the basis of image data or profile data obtained by capturing an image of or scanning a surface of a mold on which the identification mark is engraved by the first engraving device; and a second engraving process for causing the second engraving device to engrave the second identification mark on the surface of the mold in a case where the identification mark has been determined to be not good in the determination process. This makes it possible to reduce a rate of occurrence of defective casting products whose mold information cannot be traced due to unreadable identification marks, as compared to a conventional rate of the occurrence.

A mold information management device according to another aspect of the present invention includes: at least one processor; a first engraving device configured to engrave an identification mark; and a second engraving device different from the first engraving device, the processor carrying out: a determination process for determining whether the identification mark is good or not, on the basis of image data or profile data obtained by capturing an image of or scanning a surface of a mold on which the identification mark is engraved by the first engraving device; a second engraving process for causing the second engraving device to engrave the second identification mark on the surface of the mold in a case where the identification mark has been determined to be not good in the determination process; a second determination process for determining whether the second identification mark is good or not, on the basis of image data or profile data obtained by capturing an image of or scanning a surface of the mold on which the second identification mark is engraved by the second engraving device; and an associating process for associating the second identification mark with information on at least one of history and properties of the mold, in a case where the identification mark has been determined to be good in the second determination process. This makes it possible to reduce a rate of occurrence of defective casting products whose mold information cannot be traced due to unreadable identification marks, as compared to a conventional rate of the occurrence.

A mold information management device according to another aspect of the present invention includes: at least one processor; a first engraving device configured to engrave an identification mark; and a second engraving device different from the first engraving device, the processor carrying out: a determination process for determining whether the identification mark is good or not, on the basis of image data or profile data obtained by capturing an image of or scanning a surface of a mold on which the identification mark is engraved by the first engraving device; a second engraving process for causing the second engraving device to engrave the second identification mark on the surface of the mold in a case where the identification mark has been determined to be not good in the determination process; a second determination process for determining whether the second identification mark is good or not, on the basis of image data or profile data obtained by capturing an image of or scanning a surface of the mold on which the second identification mark is engraved by the second engraving device; and an instruction process for giving an instruction not to pour molten metal into the mold, in a case where the identification mark has been determined to be not good in the second determination process. This makes it possible to reduce a rate of occurrence of defective casting products whose mold information cannot be traced due to unreadable identification marks, as compared to a conventional rate of the occurrence.

SUPPLEMENTARY NOTE

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 casting system
2 molding machine
3 conveyer line
4 laser engraving device
5 pouring machine
6 line controller (mold information management device)
7 mold assembling device
8 camera (data obtaining device)
8A second camera
9 second engraving device
10 head
11 case
12 frame member
13 camera stand
20 blowing section
21 discharge nozzle
22 carry-in opening
23 carry-out opening
30 head control section
M mold
P part to be engraved
L laser beam
S work space
G gas

The invention claimed is:

1. A mold information management device comprising at least one processor, the processor carrying out:
   a determination process for determining whether an identification mark is good or not, on the basis of image data or profile data obtained by capturing an image of or scanning a surface of a mold on which the identification mark is engraved;
   an associating process for associating the identification mark with information on at least one of history and properties of the mold, in a case where the identification mark has been determined to be good in the determination process; and
   at least one of a process for giving an instruction not to pour molten metal into the mold and a process for notifying an operator by an alarm, in a case where the identification mark has been determined to be not good in the determination process.

2. The mold information management device according to claim 1, wherein in the determination process, whether the identification mark is good or not is determined, by using a learned model, on the basis of the image data or the profile data.

3. The mold information management device according to claim 1, wherein the information on the at least one of the history and the properties of the mold is part of shift data.

4. The mold information management device according to claim 1, further comprising: a second engraving device different from an engraving device which engraves the identification mark, in a case where the identification mark has been determined to be not good in the determination process, the processor (i) causing the second engraving device to engrave a second identification mark on the surface of the mold, and (ii) determining whether the second identification mark is good or not, on the basis of image data or profile data of the second identification mark.

5. A casting system comprising a mold information management device according to claim 1.

6. A mold information management method comprising:
   a determination process in which at least one processor determines whether an identification mark is good or not, on the basis of image data or profile data obtained by capturing an image of or scanning a surface of a mold on which the identification mark is engraved;
   an associating process in which the at least one processor associates the identification mark with information on at least one of history and properties of the mold, in a case where the identification mark has been determined to be good in the determination process; and
   at least one of a process for giving an instruction not to pour molten metal into the mold and a process for notifying an operator by an alarm, in a case where the identification mark has been determined to be not good in the determination process.

7. The mold information management method according to claim 6, wherein the determination process is carried out by using a learned model.

8. A computer-readable non-transitory storage medium storing a program for causing a computer to carry out:
   a determination process for determining whether an identification mark is good or not, on the basis of image data or profile data obtained by capturing an image of or scanning a surface of a mold on which the identification mark is engraved; and
   an associating process for associating the identification mark with information on at least one of history and properties of the mold, in a case where the identification mark has been determined to be good in the determination process; and
   at least one of a process for giving an instruction not to pour molten metal into the mold and a process for notifying an operator by an alarm, in a case where the identification mark has been determined to be not good in the determination process.

* * * * *